United States Patent
Yarema et al.

[15] 3,656,047
[45] Apr. 11, 1972

[54] MULTI-PHASE INVERTER USING ISOLATED DIRECT CURRENT SUPPLIED FOR FIRING THE SCRS

[72] Inventors: Raymond J. Yarema, La Grange Park; George H. Studtmann, Mount Prospect, both of Ill.

[73] Assignee: Borg-Warner Corporation, Chicago, Ill.

[22] Filed: Feb. 4, 1971

[21] Appl. No.: 112,527

[52] U.S. Cl. ............................ 321/5, 307/252 K, 321/45 C
[51] Int. Cl. ........................................................... H02m 7/52
[58] Field of Search .................. 307/252 K; 321/5, 45, 45 C

[56] References Cited

UNITED STATES PATENTS

| | | | |
|---|---|---|---|
| 3,398,350 | 8/1968 | Ruff | 321/45 R X |
| 3,406,328 | 10/1968 | Studtmann | 321/45 R |
| 3,487,278 | 12/1969 | Turnbull et al. | 321/45 R X |
| 3,495,149 | 2/1970 | Swain | 321/45 R X |
| 3,496,092 | 2/1970 | Fraser | 321/45 R X |
| 3,518,526 | 6/1970 | Genuit | 321/45 R X |
| 3,526,789 | 9/1970 | Gyugyi et al. | 307/262 |

Primary Examiner—William M. Shoop, Jr.
Attorney—Donald W. Banner, William S. McCurry and John W. Butcher

[57] ABSTRACT

An impulse commutated, variable output frequency, multiphase inverter type of power switching system employing main SCRs to handle the primary output currents and auxiliary SCRs to aid in commutating the main SCRs is disclosed wherein the firing of the SCRs is done by using isolated direct current supplies. Each SCR is fired by a separate driving circuit which includes individual isolated direct current supply and a switch unit to connect that supply directly to the gate-cathode circuit of the associated SCR. The control circuitry includes an oscillator whose output frequency is selectively variable, and a three-phase square-wave generator driven by the oscillator which produce two square-waves, one the inverse of the other, for each phase. Each of these six outputs of the generator drives a pulse and a delay pulse circuit which respectively produce a first pulse and a delayed second pulse in response to each change of polarity of the particular square-wave input. These pulse and delay pulse are inductively coupled to different ones of the multivibrator circuits to turn on the switch unit and to "fire" an SCR in accordance with a predetermined sequence so as to generate a three-phase a.c. output from the inverter. This arrangement allows for short rise times and fast turn-off of the SCR gate drive and also allows the output frequency to be varied over a large range from d.c. to large values.

14 Claims, 9 Drawing Figures

Patented April 11, 1972

Inventor
Raymond J. Yarema
George H. Studtmann
By Richard G. Kinney
Attorney

Inventors
Raymond J. Yarema
George H. Studtmann

By Richard G. Kinney
Attorney

Patented April 11, 1972

Inventors
Raymond J. Yarema
George H. Studtmann
By *Richard G. Kinney*
Attorney

MULTI-PHASE INVERTER USING ISOLATED DIRECT CURRENT SUPPLIED FOR FIRING THE SCRS

FIELD OF THE INVENTION

This invention relates to power switching systems and especially to static inverter systems and to electrical control circuits for solid state power switches such as Controlled Rectifier devices.

The present invention is primarily concerned with inverter systems and especially with the switch type of inverter in which SCRs, Silicon Controlled Rectifiers, or the like, are employed as the primary power handling elements. In switching a number of such power switches as the SCR in the past, either radio frequency (r.f.) alternating current bursts or transformer coupled d.c. pulses have been impressed on to the control electrode or gate of the main power switch. While satisfactory results in many environments of use have resulted from these approaches, they have suffered from several serious drawbacks. For example, the transformer coupling approach requires impractically larger transformers at lower frequencies. Also, the transiences present in r.f. inverter systems may lead to delayed turn off.

The present invention may also have applications outside of static inverter field per se, as in a d.c. to d.c. converter system. However, the primary utility of this invention is envisioned to be in the art of static inverters such as complimentary commutated and especially, auxiliary SCR commutated inverters. The invention will therefore be described with such an auxiliary SCR commutated inverter.

A primary object of the present invention is to provide a control for such an inverter which has a wide frequency output range including no lower frequency limit with low noise and improved SCR drive capability. A secondary object of the invention is to enable fast rise-time drive signals to be developed and employed to allow hard firing of the SCR.

SUMMARY OF THE INVENTION

In achieving one or more of the above objects, the present invention provides, in a solid state power switching system (such as an inverter) the improvement comprising having at least two isolated direct current supplies and a number of switching units, one for each power switch, for conductively coupling one of the isolated supplies to the control circuit of one power switch to selectively drive it "on." Means for controlling the switching of the switch units to control the power switches are also provided. This conductive coupled isolated power supply prevents interaction through the drive circuitry and allows for low frequency operation of the switching circuit.

Also provided in accordance with one feature of the invention are means for controlling the switch units, comprising an oscillator producing pulses and delayed pulses and multivibrator circuits responsive thereto for operating the switch units for a selected period of time.

The invention, together with the further advantages thereof, may best be understood by reference to the following description taken in connection with the accompanying drawings, in the several figures of which like reference numerals identify like elements.

BRIEF DESCRIPTION OF THE DRAWINGS

FIG. 2A is a block diagram of the control system, constructed in accordance with the present invention, for a portion of the inverter of FIG. 1;

FIG. 3 is a circuit diagram of the control system of FIG. 2B with FIG. 3a being a circuit diagram of a first portion thereof, FIG. 3b being a circuit diagram of a connecting second portion to that first portion and FIGS. 3c and 3d being circuit diagrams of a plurality of identical portions each of which is coupled to the first and second portions.

DETAILED DESCRIPTION

Figure 1:
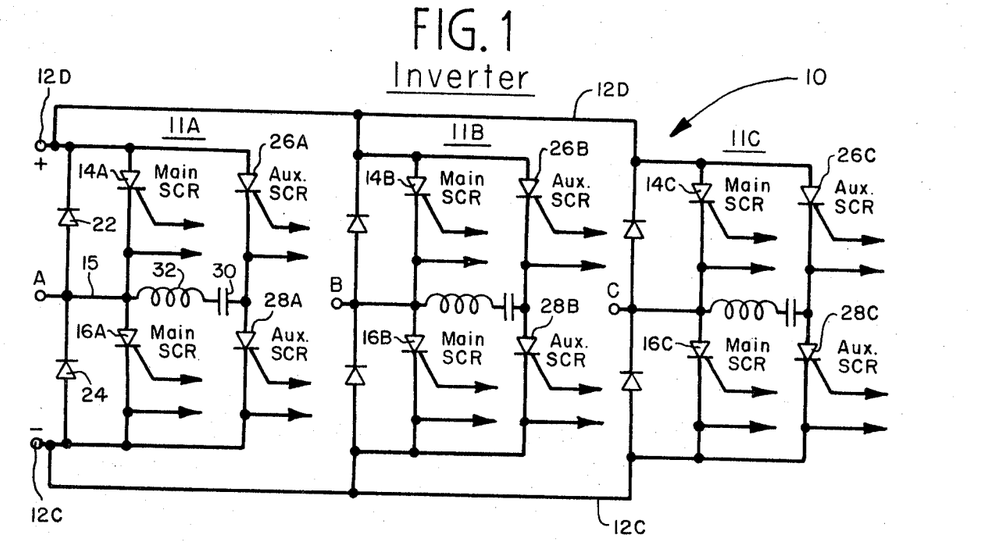
FIG. 1 is a circuit diagram of a static inverter of the auxiliary commutated type, which will be used as a specific example to illustrate the application and operation of the present invention.

Referring to FIG. 1 there is depicted a static inverter generally designated by the numeral 10. The inverter 10 is of the three-phase type and functions to change a direct current power present across the lines 12D and 12C into a three-phase alternating current power at the terminals labeled A, B and C.

The inverter 10 is of the impulse commutated type. For a general discussion of this type of inverter, reference may be had to Chapter 7 of Bedford & Hoft: "Principles of Inverter Circuits," J. Wiley & Sons, New York (1964).

The inverter 10 includes three sections or segments 11A, 11B and 11C from each of which one of the output A, B and C are taken. As each of these segments 11A, 11B and 11C are structually the same, for brevity, only the segment 11A will be described in detail, it being understood that the other two segments 11B and 11C are identical.

The inverter 10 produces the a.c. output on the terminals A, B and C, by the sequential operation of solid state power switches such as the main Silicon Controlled Rectifiers (SCRs) 14A and 16A of the segment 11A. These SCRs 14A and 16A are connected in series between the d.c. input lines 12D and 12C with their junction connected to terminal A.

In more detail, the SCR 14A has its cathode connected to a terminal line 15 (which line is connected to the output A) and its anode connected, to the d.c. input line 12 D. Similarly, the SCR 16A has its anode connected to the line 15 and its cathode connected to the other d.c. input line 12C. Two reactive energy diodes 22 and 24 are connected, respectively, between the line 12D and the terminal A and between that terminal and the line 12C so that the cathode of the diode 24 is connected to the anode of the diode 22. Also included in the section 11A are two auxiliary SCRs 26A and 28A. These SCRs are used to aid in the commutation of the main SCRs. The SCR 26A has its anode connected in common with the anode of the SCR 14A and its cathode connected to the anode of the SCR 28A. The cathode of the SCR 28A is connected in common with the cathode of the SCR 16A. Connected between the junctions of the power SCRs 14A and 16A and the SCRs 26A and 28A is a capacitor 30 and an inductor 32 which are connected in series.

Figures 2A, 3A:
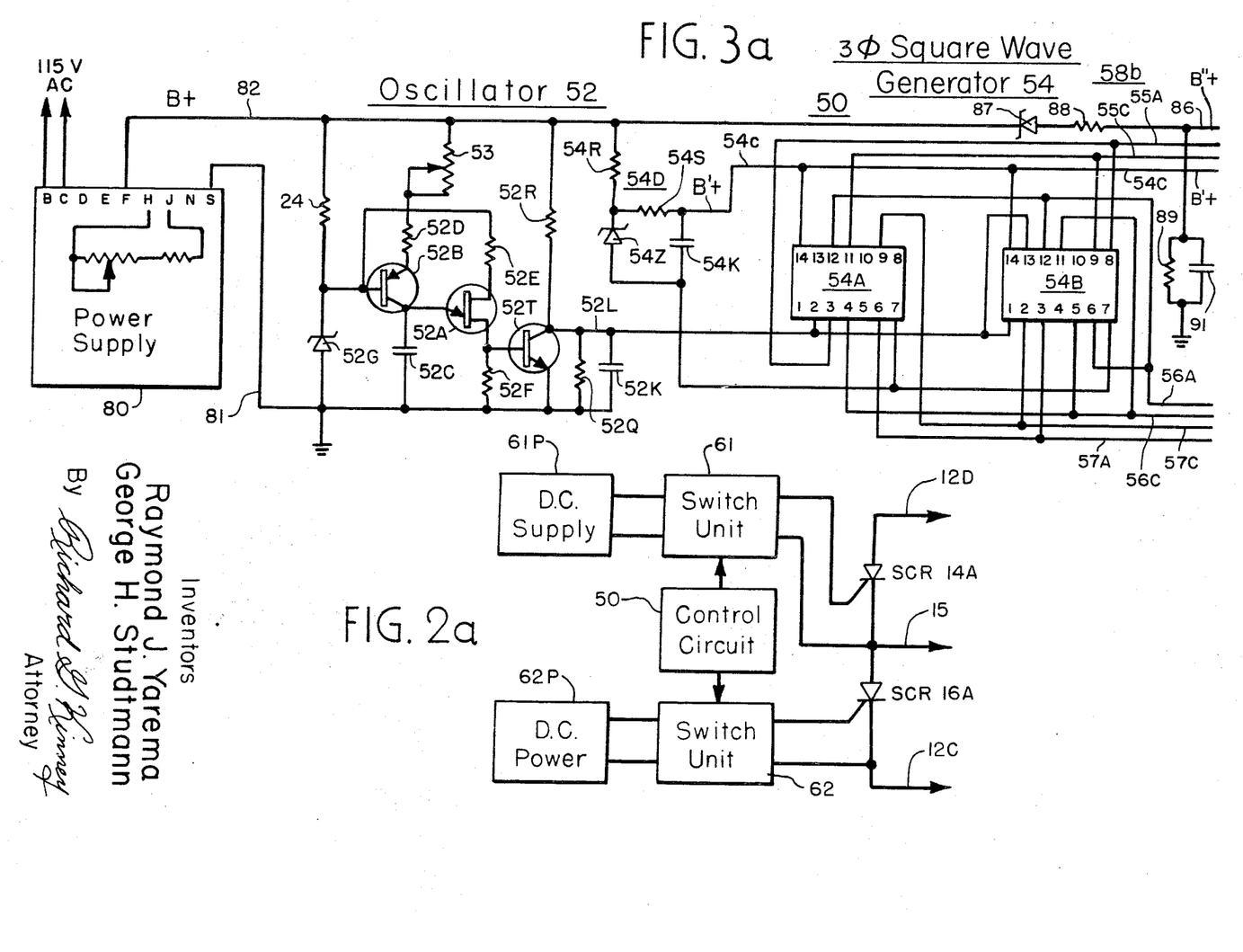

The firing of the Silicon Controlled Rectifiers 14A, 16A are controlled by d.c. impulses developed between their control electrode and their cathodes, from an inverter control circuit 50 which is depicted in FIG. 2A.

Figure 2B:
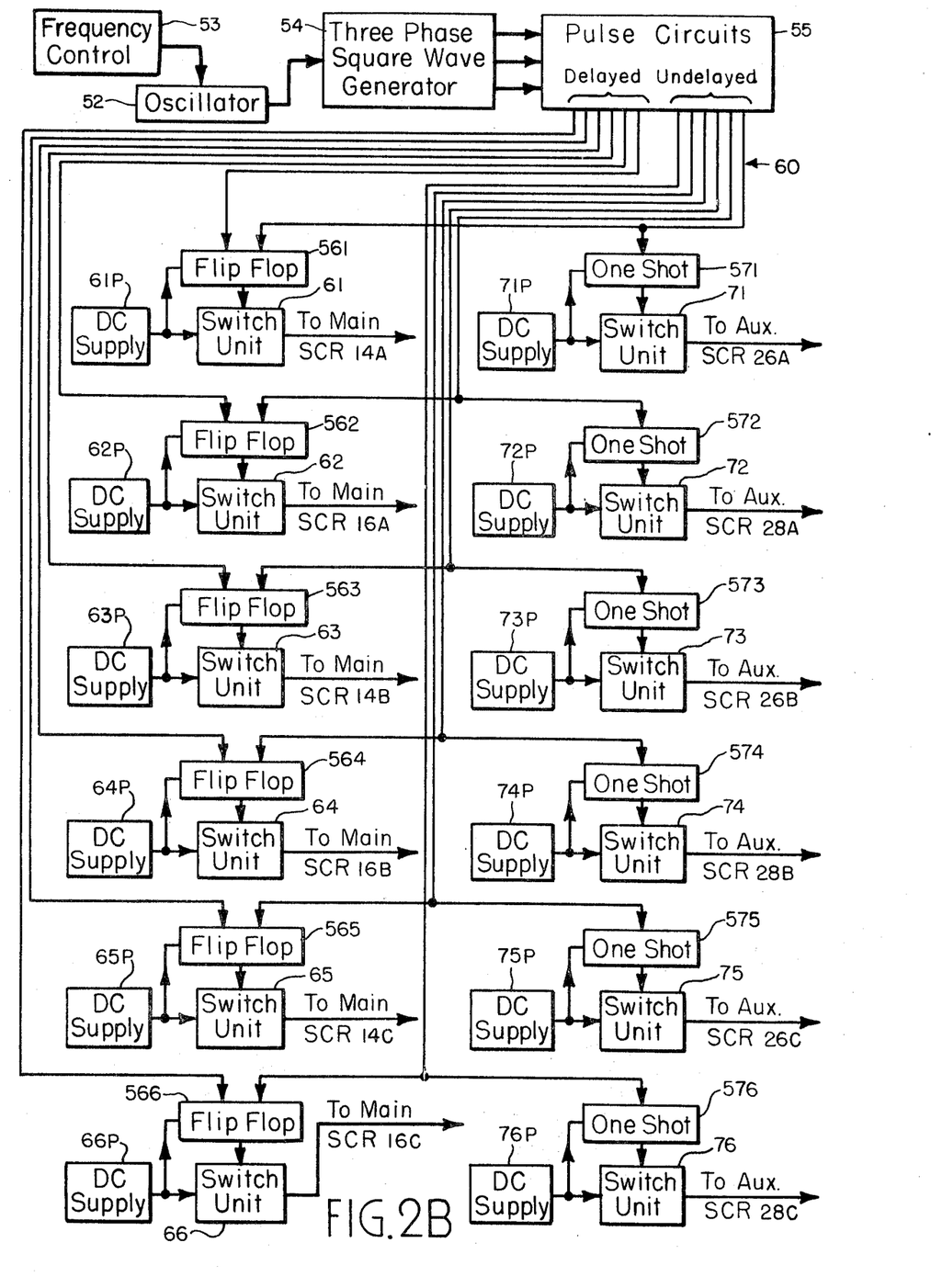
FIG. 2B is a similar diagram of the control system for the entire inverter illustrating additional principles of the present invention.

Referring to FIG. 2A it can be seen that, in accordance with the present invention, a plurality of individual direct current supplies, namely the direct current supply 61P and 62P, are provided. One isolated direct current supply is provided for each of the solid state power switches. These isolated supplies 61P and 62P are connected and disconnected from the control-cathode circuits of, respectively, the SCRs 14A and 16A by one of a plurality of switch units 61 and 62. The switch units 61 and 62 are controlled by control circuits 50, to sequencially connect and disconnect the direct current voltage from the supplies 61P and 62P to the solid state power handling switches SCRs 14A and 16A. The control circuits 50 may be as shown in FIG. 2B.

Referring to that figure the control system can be seen to include, in accordance with one feature of the present invention, a plurality of multivibrators 561–566 and 571–576, one each for each of the switch units 61–66 and 71–76 which are powered from the individual d.c. supplies 61P–66P and 71P–76P. The multivibrators 561–566 are, as indicated in FIG. 2B, of the bistable or flip flop type while the multivibrators 571–576 are of the monostable or one-shot type. In each case, however, the output of the multivibrator serves to control the associated switch unit.

The multivibrators 561–566 and 571–576 are controlled from a pulse generating circuit 55 via lines 60. Pulses from the circuit 55 serve to set and reset the flip flops 561–562 and to set the one shots 571–576. The pulse generating circuits 55 are driven by the three-phase outputs of a square-wave generator 54 which in turn is driven by an oscillator 52 whose frequency (and thus the output frequency of the inverter 10) is determined by a control 53.

Referring now to FIG. 3 and especially FIG. 3a one specific embodiment of the control system 50 will be taken up in detail. As should be there noted, the oscillator 52 as well as the square-wave generator 54 and the pulse and delay pulse circuits 58 are all powered from a common power supply 80. The power supply 80 includes an output line 81 which will here be taken as the reference or ground line and a B+ line 82. The oscillator 52 is of the relaxation oscillator type includes a unijunction transistor 52A whose control electrode is coupled to the collector of a PNP transistor 52B. The collector of the transistor 52B is connected through a capacitor 52C to ground while its emitter is connected through a fixed resistor 52D and a series connected variable resistor 53 to B+ line 82. Adjustment of the resistance of the variable resistor 53 determines the frequency of oscillation for the oscillator 52. It thus functions as the frequency control unit 53 of FIG. 2B.

The base of the transistor 52B is coupled through a resistor 52E to Base 1 of the unijunction transistor 52A. Base 2 of the unijunction transistor 52A is coupled through a resistor 52F to ground. The base of the transistor 52B is held at a fixed potential level via the use of a zener break-down diode 52G whose cathode is connected to the base of the transistor 52B and whose anode is connected to ground. The base of the transistor 52B is further connected through a voltage dropping resistor 52H to the B+ line 82.

The oscillator 52 also includes a third transistor 52T of the NPN type whose emitter is coupled to ground and whose collector is connected to the junction of a voltage dividing circuit comprising a resistor 52R and 52Q which are series connected between the B+ line 82 and ground. The base of the transistor 52T is connected to Base 2 of the unijunction transistor 52A and the collector of the transistor 52T is connected to an oscillator output line 52L to the three-phase square-wave generator 54. This line 52L is connected to ground through a capacitor 52K.

The square-wave generator 54 includes three flip flop units made from two integrated circuit units 54A and 54B respectively of the type MC 845P, 856P which are supplied with operating potential B'+ on line 54C from a voltage source 54D. The voltage B'+ on line 54C is less than that of B+. This source 54D is formed from a Zener diode 54Z whose anode is grounded and whose cathode is connected to the junction between a series connected pair of resistors 54R and 54S, which pair of resistors are connected between lines 82 and 54C. Also connected between ground and line 54C is a capacitor 54K.

The integrated circuit units 54A and 54B are connected together in a conventional manner with the B'+ line 54C connected to their terminals conventionally numbered 14 with their terminals No. 7 connected to ground. The input line 52L is connected to No. 2 terminal of the unit 54A and the No. 1 and No. 13 terminals of the unit 54B.

The additional connections are for the units 54A: terminal No. 1, unconnected; terminal No. 3 connected to terminal No. 8 of the unit 54B; terminal No. 4 connected to terminal No. 5 of the unit 54B; terminal No. 5, unconnected; terminal No. 6, connected to the output line 57A, terminal No. 9 connected to the output line 57C, terminal No. 8 unconnected, terminal No. 10 unconnected, terminal No. 13 unconnected, terminal No. 11 connected to terminal No. 9 of the unit 54B, terminal No. 12 connected to terminal No. 12 of the unit 54B.

Additional connections of the unit 54B are: terminal No. 2 connected to the output line 57C; terminal No. 3 connected to the line 57A; terminal No. 4 unconnected; terminal No. 5 connected to an output line 56C; terminal No. 6 connected to an output line 56A; terminal No. 8 connected to an output line 55A; terminal No. 9 connected to an output line 55C; terminal No. 10 unconnected, terminal No. 11 connected to the output line 56C; terminal No. 12 connected to the output line 56A.

Also depicted in FIG. 3a is a potential supply 58D to supply a third d.c. potential B″+ for the Pulse and Delayed Pulse Circuits 55. The supply 58D includes a Zener diode 87. The cathode of the Zener diode 87 is connected to the B+ line 82 and its anode is connected to one end of a resistor 88. The other end of the resistor 88 is connected to a B″+ output line 86 and through a resistor 89 to ground. A voltage stabilizing capacitor 91 is also provided connected in parallel with the resistor 89.

Figure 3B:
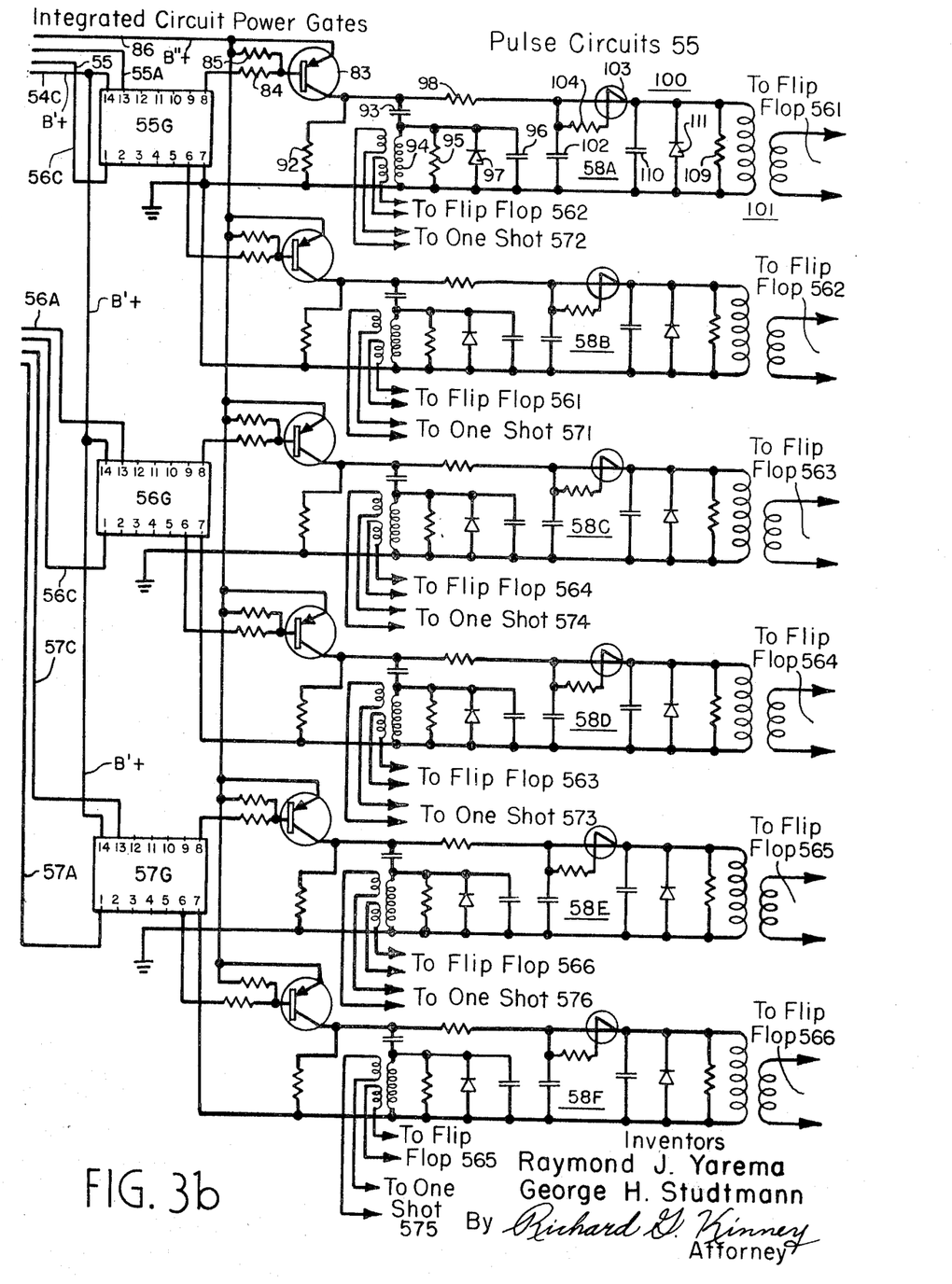

Referring to FIG. 3b it can be seen that the pulse generating circuits 55 include the integrated circuit power gate units 55G, 56G and 57G which function to amplify the square-wave signals. Suitable units for the integrated circuit 55G, 56G and 57G are those made by Motorola, part designation: MC 884P. As each gate 55G, 56G and 57G are the same, for brevity only the connection of gate 55G will be described.

The input lines 55A and 55C are connected respectively to the No. 13 and No. 1 terminals with the B′+ connected to No. 14 terminal and terminals No. 2 through No. 5 and No. 9 to No. 12 unconnected. Terminal No. 7 is grounded and the output of the unit 55G is taken from No. 8 and No. 6 terminals to ground. Thus, two outputs are taken from the unit 55X via No. 6 and No. 8 terminals. A pulse circuit generally designated 58A–58F each of which are identical. As such, for brevity only, the circuit 58A will be described in detail, it being understood that the components and interconnects of each of the circuits 58B–58F are the same.

The output from the integrated circuit 55G is fed to the base of a PNP transistor 83 through a resistor 84. The base of a transistor 83 also is coupled through a resistor 85 to the B″+ line 86.

The emitter of the transistor 83 is connected to the B″+ line 86 while its collector is connected through an operating bias establishing resistor 92 to ground. The output signal from the transistor 83 is taken from its collector and coupled via a capacitor 93 to one side of the primary coil of a transformer 94. The other side of the primary coil of the transformer 94 is connected to ground. Connected across the primary coil of the transformer 94 is a resistor 95 in parallel with a capacitor 96. The resistor 95 and capacitor 96 serve to suppress undesirable transients. Also connected across the primary coil of the transformer 94 is a diode 97 having its anode connected to ground and cathode connected to the junction between the primary coil of the transformer 94 and the capacitor 93.

The collector of the transistor 83 is also connected to a resistance 98 to delay circuit generally designated 100. The delay circuit 100 has an output transformer 101 from which a delay pulse is taken. The delay period is determined by the adjustment of the variable resistor 98.

The circuit 100 includes a Silicon Unilateral Switch (SUS) device 103 whose cathode terminal is connected to one end of the primary winding of the transformer 101. The other side of this primary is grounded. Also connected from this terminal to ground is the parallel combination of a resistor 109, a capacitor 110 and a diode 111 with its anode grounded. The resistor 109 and capacitor 110 function to suppress undesirable transients. The anode terminal of the SUS 103 is connected to the resistor 98, and through a capacitor 102 to ground and also through a resistor 104 to the gate terminal of the SUS 103.

The output transformers 94 and 101 serve the function indicated in FIG. 2 by the lines 60, that is, to couple the output from the pulse circuit 58 to individual multivibrator circuits 571–566 and 571–576. In the case of circuit 58A these are respectively to the multivibrators 561, 562 and 572. As each of the multivibrators 561–566 are identical and their power supply 61P–66P are also identical, for brevity only one of each type will be described in detail, it being understood that the others are the same except for the particular input transformer and the control SCR 14.

Figure 3C:
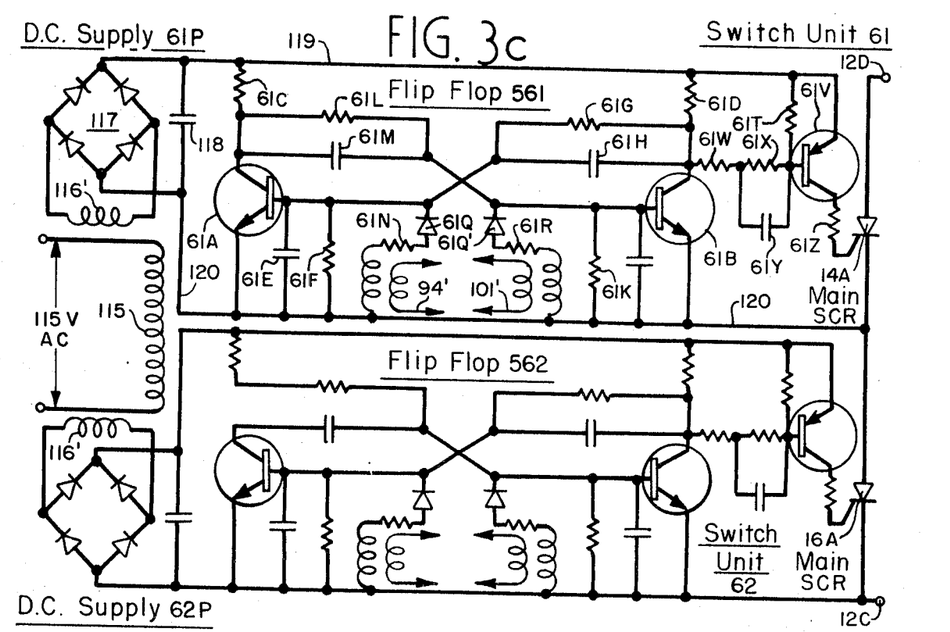

Referring now to FIG. 3c the multivibrator 561 and 562 and their d.c. power supplies 61P and 62P are there depicted together with the switch units 61 and 62. Both of the d.c. supplies 61P and 62P derive power from a common primary coil 115 which is connected across a suitable a.c. input, such as the commonly available 115 volt a.c. The coil 115 is a transformer coupled to two secondary coils 116 and 116' each of which is connected across a bridge rectifier circuit such as the bridge 117 of the power supply 61P. The bridge 117 is a conventional full-wave rectifier including four diodes and having its output across a smoothing capacitor 118. The pair of output lines 119 and 120, with the line 119 being a positive d.c. voltage above the line 120, couple the rectifier's output voltage to the flip flop 561. The multivibrator circuit 561 includes two NPN transistors 61A and 61B whose emitters are connected to the line 120 and whose collectors are respectively connected through a biasing resistor 61C, 61D to the bias line 119. The base of a transistor 61A is connected through the parallel circuit arrangement of a capacitor 61E and resistor 61F to the line 120 and also through the parallel circuit arrangement of a capacitor 61E and resistor 61G to the collector of the transistor 61B. The base of the transistor 61B is similarly connected to via parallel connected a 61K resistor and capacitor 61J to ground and through a parallel connected resistor 61L and capacitor 61M to the collector of the transistor 61A.

The inputs to multivibrator circuit 561 are taken from the secondary coil of the transformers such as the transformers 94 and 101 of FIG. 3b. The particular inputs for each of the flip flops 561–566 are detailed in FIG. 3b, but it is sufficient at this point to understand that an undelayed pulse signal impressed on the secondary from a primary transformer such as 94 is coupled to the base of the first transistor such as 61A while a delayed pulse is impressed via the secondary of a transformer, such as the transformer 101, in the base circuit of the second transistor, such as the transistor 61B. Thus, in FIG. 3c and especially with respect to the flip flop 561 the secondary of a transformer there designated 94' is shown connected between the line 120 and one side of a resistor 61N. The other side of the resistor 61N is connected to the anode of a diode 61Q whose cathode is connected to the base of the transistor 61A. And similarly the secondary of a transformer designated 101' is connected from the line 120 to one side of a resistor 61R whose other side is connected to the anode of a diode 61S and the cathode of that diode is connected to the base of the transistor 61B.

The output of the multivibrator 561 is coupled to control the switch unit 61, from the collector of the transistor 61B through a resistor 61W which is connected in series with the parallel connection of a resistor 61X and capacitor 61Y to the base of a solid state switch 61V of the PNP transistor type whose emitter is connected to the d.c. supply line 119 while the collector is connected through a resistor 61Z to the control electrode of the SCR 14A.

Thus, the d.c. output of the isolated direct current supply 119 is conductively coupled to the gate of the SCR 14. "Conductive coupling" between two points in an electric circuit as used herein and in the appended claims, refers to a path between such points which could pass direct current responsive to application of a d.c. potential difference between such points. Thus, it might encompass a direct connection, a resistive dividing network or, as shown, an active circuit element responsive to the d.c. potential difference.

Figure 3D:
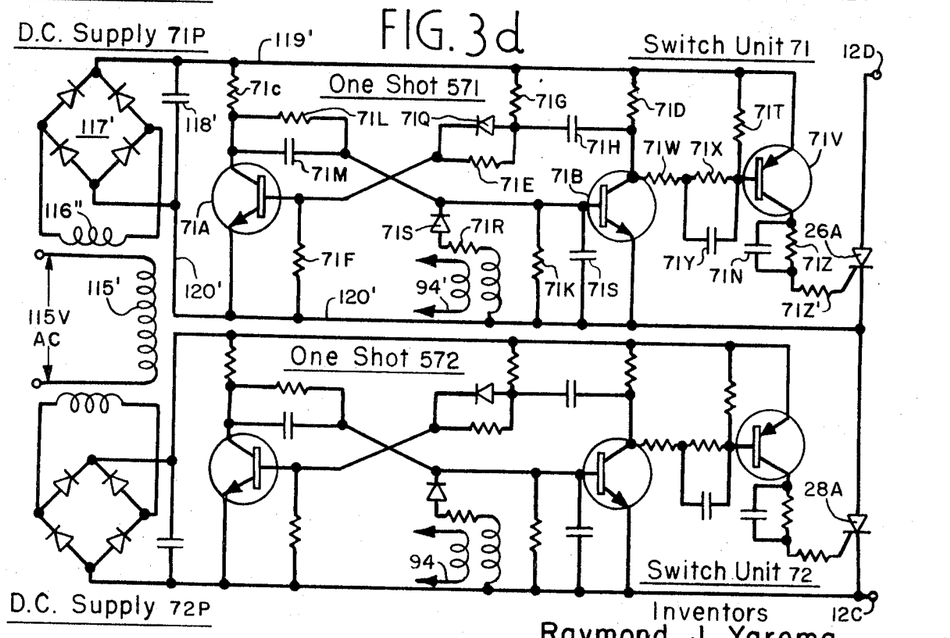

Referring to FIG. 3d, the multivibrators 571 and 572 of the one-shot type are there depicted together with their associated d.c. supplied 71P, 72P and switch units 71, 72. As each of these are identical in construction only the circuit of the one-shot or monostable 571 and its associated switch unit 71 will be described in detail. The direct current supply for each pair of the one-shots 571 and 572 and the switch units 71; 72 is derived in a similar manner from that as in FIG. 3c which developes a d.c. potential between the pair of lines 119' and 120'.

The multivibrator 571 includes a pair of NPN transistors 71A and 71B whose emitters are connected to the line 120' and whose collectors are connected respectively through resistors 71C and 71D to the line 119'. The base of the transistor 71A is connected through resistor 71F to the line 120' and also through another resistor 71E to one side of a capacitor 71H whose other side is connected to the collector of the transistor 71B. The junction of the resistor 71E and the capacitor 71H is connected through a resistor 71G to the line 119'. Also connected from that junction point across the resistor 71E is a diode 71Q. The cathode of the diode 71Q is connected to the base of the transistor 71A. The anode of the diode 71Q is connected to the junction between the resistors 71E and 71G. The base of the transistor 71B is connected through a capacitor 71J to the line 120' and is also connected through a resistor 71K to that line. The base of the transistor 71B is further connected through a capacitor 71M to the collector of the transistor 71A. A resistor 71L is connected in parallel with the capacitor 71M.

Unlike the multivibrators, such as the flip flop 61 of FIG. 3c, the multivibrators 71–76, such as the one-shot 71, have only one input from the pulse circuits 58 which input is inserted into the base circuit of the second transistor such as the transistor 71B. To this end a secondary of an output transformer such as the transformer 94 of FIG. 3b is provided. To this end such a transformer is included in FIG. 3d and designated transformer 94'.

The secondary from the transformer 94' has one side connected to the line 120' and its other side connected through resistor 71R and to the anode of a diode 71S whose cathode is connected to the base of the transistor 71B.

The output from the multivibrator 571 is coupled to the switch unit 71 from the collector of the transistor 71B. The switch unit 71 includes a solid state switch 71V of the PNP transistor type. That is, the output from the collector of the transistor 71B is connected through a resistor 71W, a parallel circuit connection of another resistor 71X and a capacitor 71Y to the base of the transistor 71U which base is also connected through a biasing transistor 71T to the direct current line 119'. The emitter of the transistor 71U is connected to that line also, while the collector of that transistor is connected through a resistor 71Z, which is in parallel connection with a capacitor 71N, a series connected resistor 71Z' to the control electrode of the auxiliary SCR 26A. The capacitor 71N serves to develop a fast rise high peak impulse to hard fire the SCR 26A.

OPERATION OF THE SYSTEM

In overall operation the above described system functions to turn on and off the main SCRs of the inverter of FIG. 1 in such a manner and so as to produce alternating current outputs between the terminals A, B and C of a frequency that is selected by the setting of the frequency control 53 and which frequency is selectively variable by changing that setting.

Figure 4:
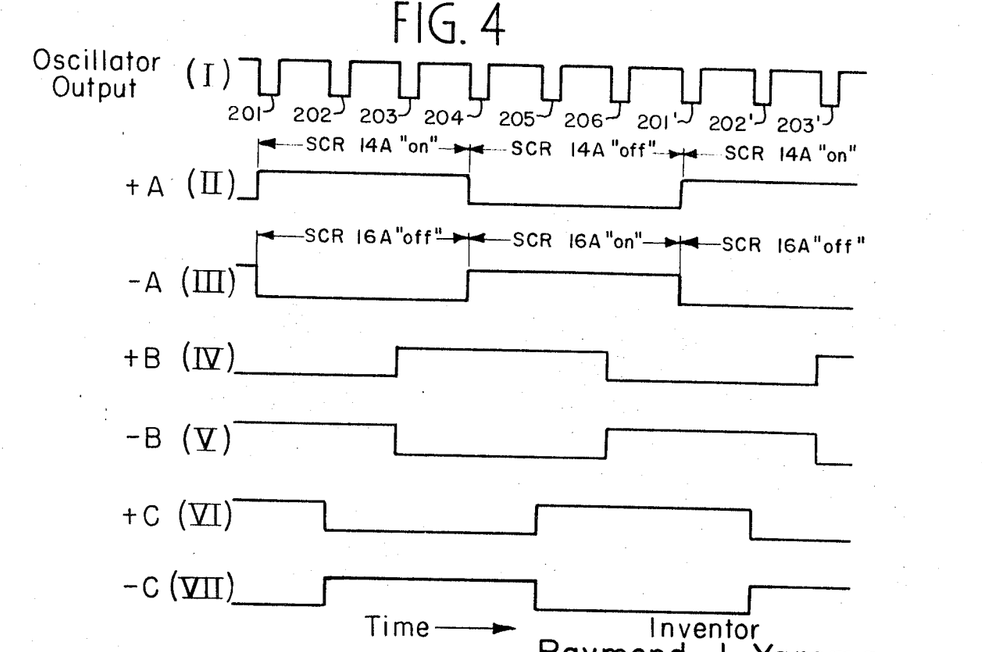
FIGS. 4 and 5 are graphical representation of the time relationships between certain signals at certain points of the control system of FIGS. 1–3 which representation is useful for understanding the operation of the system.
Figure 5:
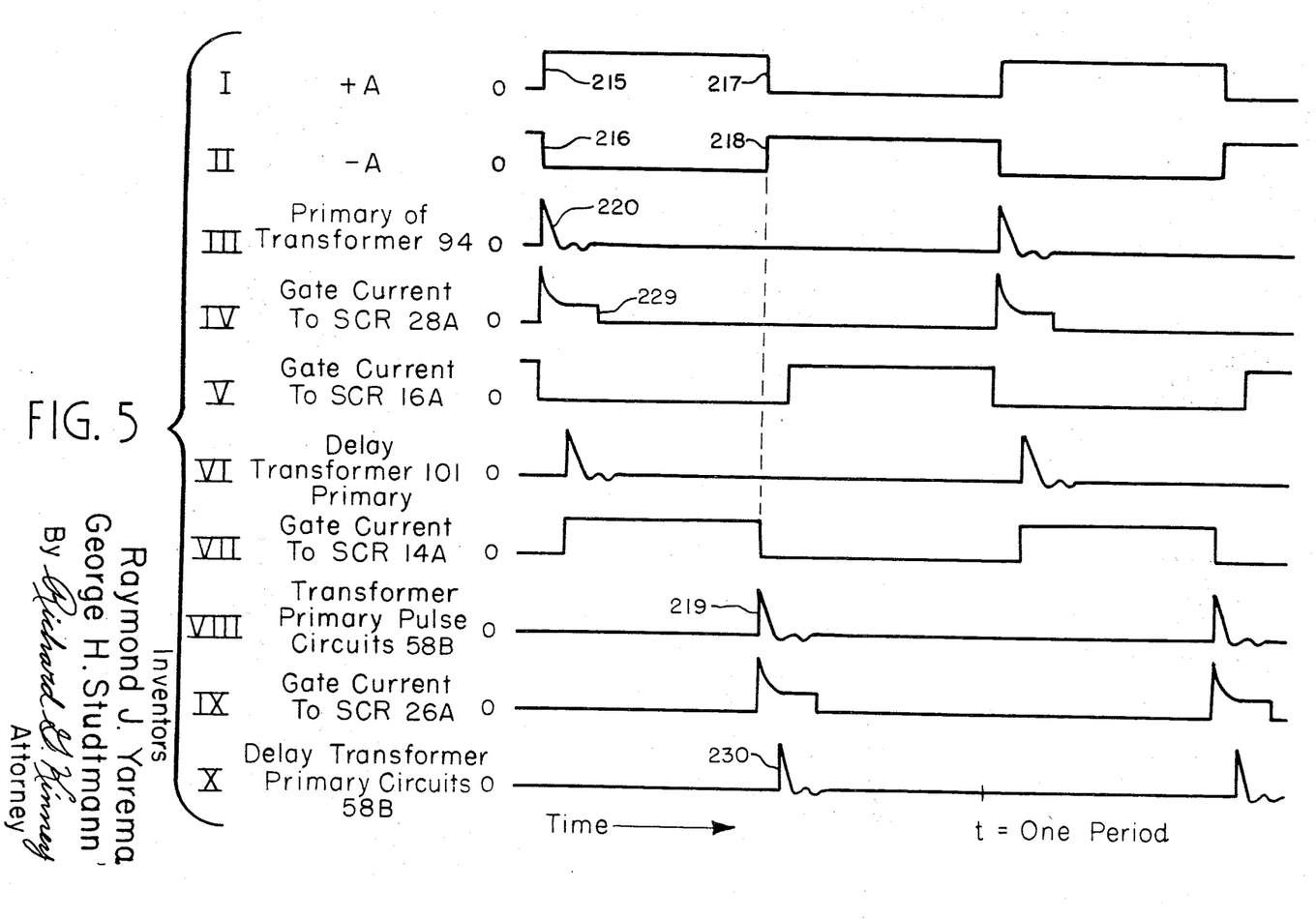

Referring to FIGS. 2 and 3 together with the Graphs of FIGS. 4 and 5 the detailed operation will now be considered. Graph I of FIG. 4 represents the output from the oscillator 52 such as would be developed between line 52L and ground in FIG. 3a. In response to this signal the three-phase square-wave generator 54 produces three square-wave outputs. On the lines 55A, 55C a square-wave of a first phase is developed. The voltage levels on these lines with respect to ground are depicted in FIG. 4 at respectively Graphs II and III. The first square-wave +A, Graph II, begins its cycle at a negative pulse 201 of the oscillator output, Graph I, switches polarity at a fourth pulse 204 and begins its cycle again at pulse 201' after three more oscillator pulses. The corresponding signals on the output lines 56A and 56C for phase "B" are depicted in Graphs IV and V while those for lines 57A and 57C for phase "C" are shown in Graph VI and VII of FIG. 4. These square-wave signals ±B and ±C respectively begin their cycles at the third negative pulse 203 and the second negative pulse 202 of the oscillator output, Graph I. They switch polarity after three pulses (at pulses 206 and 205 respectively) and begin their cycles anew after six pulses.

These signals ±A, ±B and ±C of Graphs II-VII are used to drive the integrated circuit power gates 55G, 56G and 57G (FIG. 3b) which increase the signal voltage level. The six amplified output signals corresponding to Graphs II through VII are then fed to respective ones of the transistors corresponding to the transistor 83 in each stage of the pulse circuits (FIG. 3b). These transistors drive their respective pulse circuits 58A-58G which includes a main pulse circuit (whose pulse is from the transformer corresponding to the transformer 94 in circuit 58A) and a controllable delay pulse circuit such as the circuit 100.

The controllable delay provides a time interval between the firing of the main SCRs and the auxiliary SCRs. Each delay is generated by a variable resistance RC circuit which charges the capacitor (such as the capacitor 102) to a predetermined level at which point the SUS (such as the SUS 103) breaks down to produce the delayed timing signal. The pulse and delayed pulse signals are coupled to the monostable and bistable circuits 561-566, 571-576 which control the switch units 61-66, 71-76 and thus the gate signals to the inverter's SCRs in the manner depicted in FIG. 2B.

Isolated d.c. power supplies (FIGS. 3c and 3d) for the SCR driver circuit such as those including the flip flop 561 or 562 or the one-shot 571 or 572 are obtained from line transformers with two independent secondary windings. Each of the secondary winding signals is full-wave rectified by a rectifier unit (such as the unit 117 of FIG. 3C) directly into a capacitor (such as the capacitor 118) to provide a filtered output of, for example, about 24 volts d.c. The pair of power supplies (such as supplies 61P, 62P or 71P, 72P) provided by each transformer provide the d.c. bias for firing either a pair of main SCRs (such as SCRs 14A, 16A) or auxiliary SCRs (such as SCRs 26A, 28A) through a switch unit 71-76, 61-66 respectively. The monostables 571-576 and bistables 561-566 draw their operating bias from their respective d.c. supplies 71P-76P, 61P-66P, and control their respective switch units. The pulse transformer inputs to the monostable and bistable circuits from the pulse circuits are capacitive loaded to avoid possible SCR misfire due to lead noise and pick-up.

The output of each bistable circuit (such as the flip flop 561) drives a switch unit (such as the unit 61) which includes a PNP transistor (such as the transistor 62V) which draws its operating power from the associate isolated d.c. supply (such as the supply 61P) and provides a constant current drive with a fast rise-time for the main SCR gates (such as the lines 14A and 16A). Each monostable circuit 571-576 drives a switch unit (such as the unit 71) which includes a transistor corresponding to the transistor 71U of FIG. 3d, which draws its operating power from the associated isolated d.c. supply (such as the supply 71P) and provides a hard fire gate signal to the auxiliary SCRs such as the SCR 26A.

As an aid to understanding, it can be stated that the signal level at each of the six outputs of the three-phase square-wave generator corresponds to an "on" or "off" condition of a main SCR. The six wave forms of Graphs II-VII correspond to the states on or off of the main SCRs of the inverter 10 of FIG. 1. Thus, when the wave forms +A of Graph II is high the main SCR 14 is on and when it is low SCR 14A is off. Similarly when the -A wave form of Graph III is high the second main 16A of the section 11A is on and when it is low SCR 16A is off. For the sections 11B and 11C the same relationship is true between the wave forms ±B and ±C and the section's main SCRs 14B, 16B and 14C, 16C. Thus, in FIG. 4 it can be seen that if the generator output is high, the corresponding SCR is on and if the output is low, the SCR is off. The state of upper main SCRs, SCR 16A for example, corresponds to the positive phase output signal, such as Graph II; the state of lower main SCRs, such as SCR 18A, corresponds to the negative phase output signal, as in Graph III.

To accurately relate the output of the square-wave generator to the inverter and to understand how the commutation signals are generated, signals for one segment of the three-phase inverter 10 will be here examined. Referring to FIG. 5, the timing sequence and drive capability for each of the SCRs in the segment 11A (phase "A") of the inverter are depicted. It should be understood that the signals for the other two segments 11B and 11C are essentially the same except for being delayed 120° and 240° in phase. The first two Graphs I and II of FIG. 5 correspond to Graphs II and III of FIG. 4 and depict the wave forms +A and -A.

Initially, it is assumed that the main SCR 16A is on. At time $t = 0$, the "A" phase outputs of the three-phase generator 54 change state as shown at 215 and 216 resulting in a pulse 220 as shown in Graph III of FIG. 5 being applied to the primary winding of the transformer 94. As can be seen in FIGS. 2B and 3b, one of the windings triggers the flip flop 562. This causes it to remove the drive signal from the main SCR 16A as depicted in Graph V of FIG. 5. the other secondary winding of the transformer 94 triggers the monostable circuit 572 which is the signal driver to the auxiliary SCR 28A. This results in a hard fire turn-on signal to be applied to the SCR 28A as shown by Graph IV of FIG. 5.

After a set delay time, the circuit 100 results in a pulse being applied to the primary of the transformer 101 (Graph VI of FIG. 5). The secondary winding of the transformer 101 triggers the flip flop 561. This results in the operation of the switch unit 61 and application of a gate drive signal to the main SCR 14A such as shown in Graph VII of FIG. 5, which turns it on. The monostable circuit 572 is designed to reset itself after a fixed time interval (as at 229 in Graph IV) such that the gate drive to auxiliary SCR 28A is automatically removed after the main SCR 14A has been fired.

At the end of a half cycle, the A-phase outputs (Graphs I and II of FIG. 5) of the three-phase generator again change state at 217 and 218, and a pulse 219, Graph VIII, is applied to the primary of the first transformer of the pulse circuit 58B (FIG. 3b). One secondary winding of this transformer applies to a pulse to the flip flop 561 in the drive circuit for the main SCR 14A and the gate drive to SCR 14A is removed. The other secondary of this transformer triggers the one-shot or monostable 571 resulting in a hard fire gate drive signal (Graph IX of FIG. 5) being applied to the auxiliary SCR 26A. After a set delay time a pulse 230 (Graph X) is applied to the primary of the delay pulse transformer of the circuit 58B. The secondary winding of this transformer triggers the flip flop 62 causing the gate drive signal to be applied to the main SCR 16A. After main SCR 16A is on, the monostable 571 which is part of the driver circuit for the auxiliary SCR 26A resets itself and the gate drive to SCR 26A is removed. Thus, one cycle of operation for one leg of the inverter is completed and the next cycle begins.

As should now be clear, the SCR gate drive which has been described above has several advantages. One is that the circuit will operate over a wide frequency range and it does not have a low frequency limitation as would direct transformer type of drive. Another is that fast rise-time signals can be readily generated. A third is that hard fire SCR gate signals may be easily obtained and finally, when desired, the SCR gate signal may be quickly removed.

Although in the above described three-phase inverter system the lower main SCRs 16A, 16B and 16C have independent power supplies, a common supply could be substituted for these three without departing from at least the broader aspects of the invention. The essential point is to employ different power supplies isolated from each other, for the main switches, such as SCR 14A and 16A, in the same leg.

The invention, for particularity has been described in one of its presently contemplated primary environments of use, an inverter system. However, as will be readily recognized by those skilled in this art, the principles of the present invention may be readily applied to Chopper systems and other power switching systems.

While a particular embodiment of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

We claim:

1. In a power switching system of the type having at least two solid state power switches conductively coupled to power input terminals, each of which power switch is responsive to a direct current signal on a control circuit thereof to switch from a very high resistance state to a very low resistance state, the improvement comprising:

two isolated direct current supplies, electrically isolated from each other;
a plurality of switching units, one for each of the power switches, each of which are conductively coupled to different ones of said power switches and to one of said two isolated supplies, to selectively conductively couple that one supply to the control circuit of the one coupled power switch; and
means for controlling the switching of each of said plurality of switching units so as to control the switching of said power switches.

2. In a power switching system of the type having at least two solid state power switches coupled substantially in series with each other and with a power input, each of which power switches is responsive to a direct current signal on a control circuit thereof, to switch from a very high resistance state to a very low resistance state, the improvement comprising:

two electrically isolated direct current voltage supplies;
an individual switching unit for each of said power switches for selectively conductively coupling one of said two isolated supplies to the control circuit of one of the two series coupled solid state power switches and for conductively coupling the other of said two isolated supplies to the control circuit of the other of the two series coupled solid state power switches, and
means for controlling the switching of each of the plurality of switching units so as to control the switching of said plurality of solid state power switches,
whereby undesirable interaction is avoided as the solid state power switches are driven from the essentially open circuit to the essentially closed circuit state.

3. The improvement as defined in claim 2 in a power switching system of the type there set out, wherein:

said individual direct current supplies are of the a.c. rectifying and smoothing type;
said switching units each includes a solid state switch.

4. The improvement as defined in claim 3 in a power switching system, of the type there set out, wherein:

said solid state switch of said switching unit is a transistor having a base and a collector-emitter circuit which collector-emitter is connected between the associated one of said plurality of direct current supplies and the control terminal of the associated solid state power switch; and
said control means includes a plurality of multivibrator circuits, one for each of said switching units, each of which is powered by the associated different one of said individual direct current supplies and has an output connected to the base of said transistor.

5. A power handling and control system comprising:

a pair of d.c. input terminals across which a direct current power supply output may be impressed;
a first and second solid state power switch connected in series across said pair of input terminals, each of which switches has a control electrode;
a first and second individual direct current supply;
a first and second switch unit connected between respectively said first and said second direct current supply and respectively the control electrode of said first and second power switch to connect and disconnect respectively said first and second direct current supply to said control electrode of respectively said first and second solid state power switches; and
control circuitry operatively connected to said first and to said second switch units for respectively causing them to connect and disconnect their said respective direct current supplies to their respective solid state power switch.

6. The power handling and control system as defined in claim 5 wherein:

said first and second solid state switches are of the Silicon Controlled Rectifier type;
said first and second individual direct current supply are of the rectified alternating current type; and
said first and second switch units are of the transistor type.

7. The power handling and control system as defined in claim 6, wherein:

said first and said second power supplies each include a different secondary coil that is coupled to one primary coil.

8. An inverter system comprising:

an inverter (10) including at least two sections (11A, 11B) each including one leg (14A–16A and 14B–16B) connected, essentially, in parallel across a pair of direct current power input terminals, (12D, 12C) each of which said one leg includes, at least, two main solid state power switches (14A, 16A, 14B, 16B) each having a control electrode, connected in series, with an output terminal (A; B) coupled to the series junction of said power switches;
at least two isolated direct current supplies (61P, 62P, 63P, 64P);
at least four switch units (61, 62, 63, 64) each of which is operatively connected so as to alternatively connect or not connect a different one of said isolated direct current supplies to the control electrode of a different one of said power switches of each one leg; and
means (50) for controlling said switch units operatively connected to each of said at least four switch units, to sequentially cause said switch units to connect and disconnect said different ones of said direct current supplies to said different one of said power switches;
whereby an alternating current output is developed between said output terminals of said at least two legs of said inverter.

9. The inverter system as defined in claim 8 wherein at least four isolated direct current suppliers (61P, 62P, 63P, 64P) are provided, one for each of said power switches.

10. The inverter system as defined in claim 9, wherein:

said solid state power switches are of the Silicon Controlled Rectifier (SCR) type;
said inverter includes means (32, 30, 22, 24, 26A, 28A) for aiding in the commutation of said SCR power switches;
said switch units include solid state switches (61B, 71U); and
said switch unit control means (50) includes:
an oscillator (52), and
means (54, 55, 561–566, 571–576), responsive to said oscillator, for producing command signals to said switch units to operate said switch units so that for any of said legs both such units do not connect their respective supply and power switches at the same time and for maintaining switching cycle rates of said two legs the same, but differing by one-third of a cycle from each other.

11. The inverter system as defined in claim 10, wherein:

said switch unit control means, further includes: means (53) whereby said oscillator may be selectively varied in output frequency;
square-wave generator (54) for producing at least a first and second square-wave output, said second output being delayed in phase by approximately one-third cycle from said first output;

pulse circuits (55) operatively coupled to said square-wave generator for producing command pulses in response to said first and second outputs of said square-wave generator; and at least four multivibrator circuits (561, 562, 563, 564) operationally having outputs coupled to the control electrodes of said solid state switches of said switch units for the control thereof.

12. The inverter system as defined in claim 9, wherein:

said inverter is of the auxiliary SCR commutated type with an auxiliary third and fourth SCR-type switches (26A, 28A, 26B, 28B) connected in series in at least two legs thereof, to form at least two sections (11A, 11B) thereby with said auxiliary SCR series connection connected to each leg in substantially parallel connection across said series-connected two main SCR and with a commutating inductance (32) and capacitance (30) connected between the junctions between the main SCRs and auxiliary SCRs of each leg;

an isolated direct current supply (71P, 72P, 73P, 74P) is provided for each of said auxiliary SCRs;

a switch unit (71-74) for each of said auxiliary SCRs is provided operatively connected for connecting and disconnecting said direct current supply (71P-74P) provided for each of said auxiliary SCRs to said auxiliary SCR; and a multivibrator circuit (571-574) is provided for each of said auxiliary SCRs, operably coupled to said pulse generating circuits for control thereby and operably connected to a different one of said switch units provided for said auxiliary SCRs, for control of that said different one switch unit.

13. The inverter system as defined in claim 12, wherein:

said multivibrator circuits are each supplied with operating bias from the one of said isolated direct current supplies associated with the one of said switch units that said each multivibrator circuit control;

said pulse circuits and said multivibrator circuits are transformer coupled together;

each of said multivibrator circuits associated with a main SCR power switch is of the bistable type;

each of said multivibrator circuits associated with an auxiliary SCR switch is of the monostable type; and said pulse circuits generates:

first pulse at a repetitive rate and period determined by said first square-wave which pulses are coupled to the two of said bistable multivibrator circuits controlling said switch units associated with the ones of the main SCR power switches of one section and to the monostable multivibrator circuits controlling the two of said auxiliary SCRs of said one section;

delayed first pulses, each of which delayed by a predetermined period from said first pulses, which are coupled to said two of said bistable multivibrator circuits controlling said switch units associated with the main SCR of said one section;

second pulses at a repetitive rate and period determined by said second square-wave which pulses are coupled to the two of said bistable multivibrator circuits controlling said switch units associated with the ones of the main SCR power switch of another section and to the monostable multivibrator circuit controlling the two of said auxiliary SCRs of said another section;

delayed second pulses, each of which is delayed in time by a predetermined period from said second pulses, which are coupled to said two of said bistable multivibrator circuits controlling said switch units associated with the main SCRs of said another section.

14. The inverter system as defined in claim 11, wherein:

said inverter is of the multiphase output type having a third section (11C) connected and constructed as said at least two sections (11A, 11B);

additional isolated direct current supplies (65P, 66P, 75P, 76P), one each for each of the SCRs of said third section are provided;

additional switch units (65, 66, 75, 76), one each for each of the SCRs of said third section are provided, each of which connects or disconnects a different one of said isolated direct current supplies to a different one of said SCRs of said third section;

said square-wave generator produces a third square-wave of the same frequency as the first and second square-waves but differing therefrom in phase by one-third of a repetitive cycle;

said switch control means includes pulse and delayed pulse circuits driven by said third square-wave and multivibrator circuits, one for each of the SCRs in said third section which are operatively coupled to the pulse and delayed pulse circuits for operation thereby.

* * * * *